United States Patent
Park et al.

(10) Patent No.: US 10,261,671 B2
(45) Date of Patent: Apr. 16, 2019

(54) MOBILE TERMINAL AND METHOD FOR CONTROLLING THE SAME

(71) Applicant: LG ELECTRONICS INC., Seoul (KR)

(72) Inventors: Cheongha Park, Seoul (KR); Goeun Joo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 27 days.

(21) Appl. No.: 15/184,223

(22) Filed: Jun. 16, 2016

(65) Prior Publication Data
US 2017/0115839 A1    Apr. 27, 2017

(30) Foreign Application Priority Data
Oct. 21, 2015    (KR) .................. 10-2015-0146717

(51) Int. Cl.
| | |
|---|---|
| *G06F 3/0484* | (2013.01) |
| *G06F 3/01* | (2006.01) |
| *G02B 27/01* | (2006.01) |
| *G06T 19/00* | (2011.01) |
| *G06F 3/033* | (2013.01) |
| *G09G 5/12* | (2006.01) |

(Continued)

(52) U.S. Cl.
CPC ......... *G06F 3/0484* (2013.01); *G02B 27/017* (2013.01); *G06F 3/011* (2013.01); *G06F 3/012* (2013.01); *G06F 3/013* (2013.01); *G06F 3/017* (2013.01); *G06F 3/033* (2013.01); *G06F 3/03547* (2013.01); *G06F 3/04815* (2013.01); *G06F 3/1423* (2013.01); *G06T 19/006* (2013.01); *G09G 5/12* (2013.01); *G02B 2027/0141* (2013.01); *G02B 2027/0187* (2013.01); *G06F 2203/0381* (2013.01); *G09G 2320/0626* (2013.01); *G09G 2330/022* (2013.01)

(58) Field of Classification Search
None
See application file for complete search history.

(56) References Cited

U.S. PATENT DOCUMENTS 9,007,401 B1    4/2015  Cho et al.
9,442,631 B1 *  9/2016  Patel ................ G06F 3/0482
(Continued)

FOREIGN PATENT DOCUMENTS

KR    10-2015-0024199    3/2015

OTHER PUBLICATIONS

International Search Report dated Oct. 25, 2016 issued in Application No. PCT/KR2016/007169.

*Primary Examiner* — Joseph R Haley
*Assistant Examiner* — Emily J Frank
(74) *Attorney, Agent, or Firm* — KED & Associates LLP

(57) ABSTRACT

The present invention relates to a mobile terminal, capable of controlling a head mounted display (HMD), and a method for controlling the same. The mobile terminal capable of controlling the HMD includes an interface unit capable of allowing for a wired connection with the head mounted display, and a controller capable of detecting an eye motion of a user wearing the head mounted display using a sensing unit provided in the head mounted display, and controlling a display unit of the head mounted display by a preset method when the eye motion corresponds to a preset motion.

24 Claims, 15 Drawing Sheets

(51) Int. Cl.
  *G06F 3/14* (2006.01)
  *G06F 3/0481* (2013.01)
  *G06F 3/0354* (2013.01)

(56) References Cited

U.S. PATENT DOCUMENTS

| | | |
|---|---|---|
| 2005/0156817 A1 | 7/2005 | Iba |
| 2012/0242570 A1* | 9/2012 | Kobayashi .............. G06F 3/017 345/156 |
| 2013/0257709 A1 | 10/2013 | Raffle et al. |
| 2015/0138451 A1 | 5/2015 | Amitai |
| 2015/0170422 A1* | 6/2015 | Aoyama ................ G06T 19/006 345/8 |
| 2017/0032575 A1* | 2/2017 | Yeoh ........................ G06F 3/011 |
| 2017/0103574 A1* | 4/2017 | Faaborg ............. G02B 27/0172 |

* cited by examiner (a)

(b)

(a)

(b)

(a)

(b)

(c)

(a)

(b)

(c)

(a)

(b)

(c)

(a)

(a)

MOBILE TERMINAL AND METHOD FOR CONTROLLING THE SAME

CROSS-REFERENCE TO RELATED APPLICATION(S)

Pursuant to 35 U.S.C. § 119(a), this application claims the benefit of earlier filing date and right of priority to Korean Application No. 10-2015-0146717, filed on Oct. 21, 2015, the contents of which is incorporated by reference herein in its entirety.

BACKGROUND

1. Field

This specification relates to a mobile terminal capable of controlling a head mounted display (HMD), and a method for controlling the same.

2. Background

Terminals may be divided into mobile/portable terminals and stationary terminals according to their mobility. Also, the mobile terminals may be classified into handheld terminals and vehicle mount terminals according to whether or not a user can directly carry.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As it becomes multifunctional, a mobile terminal can be allowed to capture still images or moving images, play music or video files, play games, receive broadcast and the like, so as to be implemented as an integrated multimedia player.

Meanwhile, glass-type terminals which are wearable on a part of a user's body are under development. Among others, a glass type terminal which is worn on a user's head portion may correspond to a head mounted display (HMD).

The HMD refers to various types of image display apparatuses which are worn on a user's head like glasses such that the user can view images (contents). Following the trend of reducing weights and sizes of digital devices, developments of various types of wearable computers are undergoing, and the HMD is also widely used.

A display unit provided at a glass type terminal such as the HMD can provide various conveniences for a user by combination with an augmented reality technology, an N-screen technology and the like, going beyond a simple image output function.

Efforts are ongoing to support and increase the functionality of mobile terminals and HMDs. Such efforts include software and hardware improvements, as well as changes and improvements in the structural components.

BRIEF DESCRIPTION OF THE DRAWINGS

The embodiments will be described in detail with reference to the following drawings in which like reference numerals refer to like elements wherein.

DETAILED DESCRIPTION

Figure 1A:
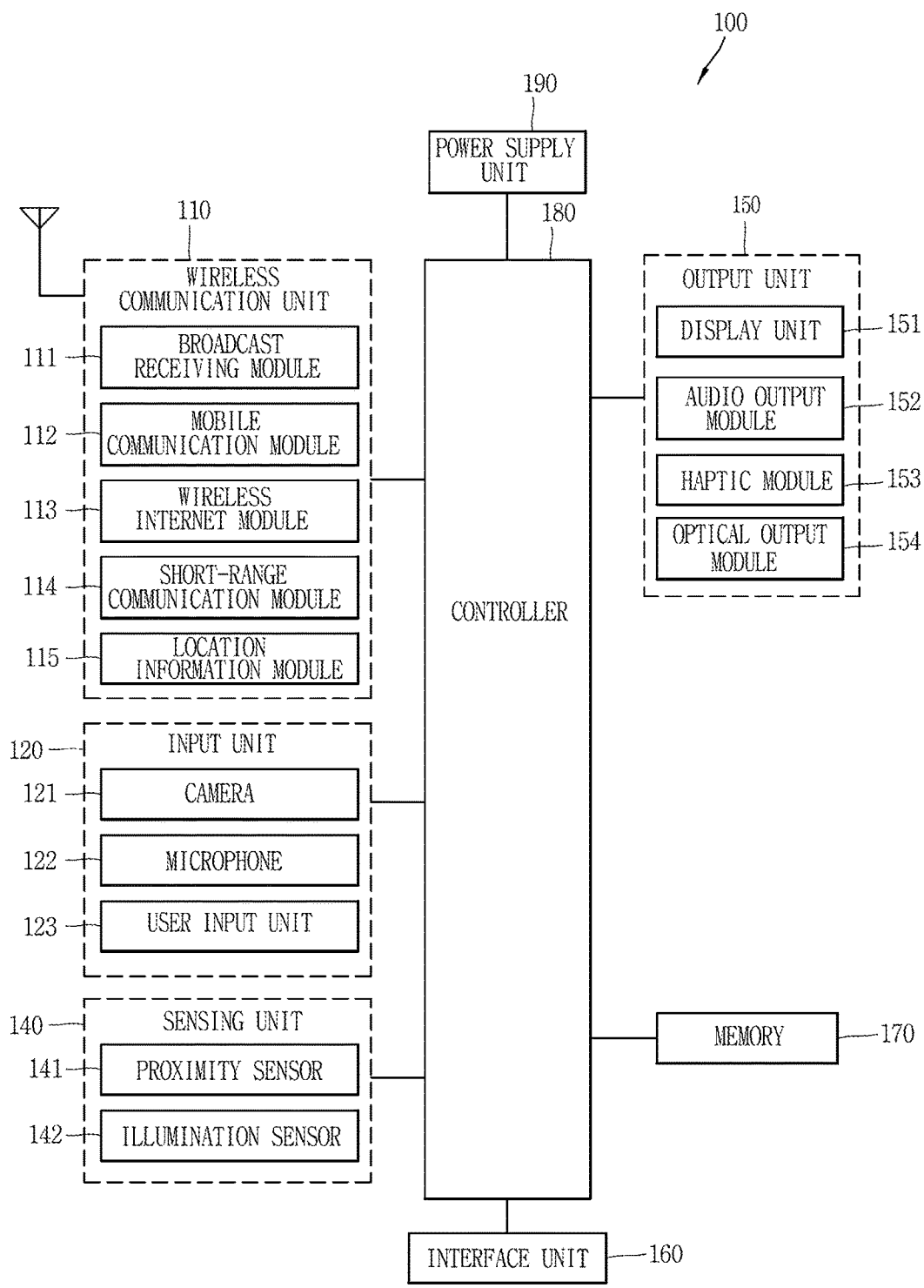
FIG. 1A is a block diagram of a mobile terminal in accordance with the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present invention, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present invention should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signage and the like.

Figure 1B:
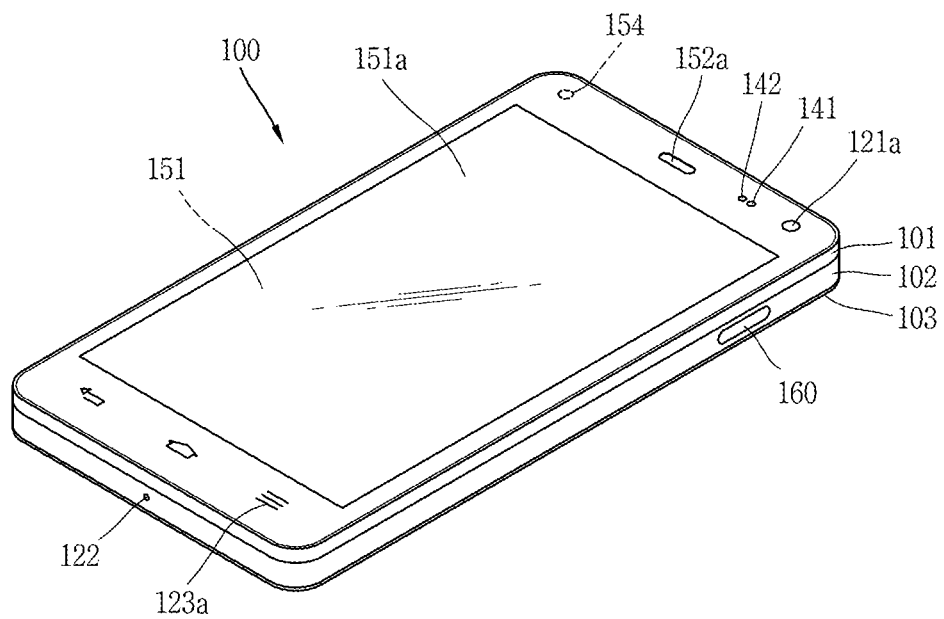
FIGS. 1B and 1C are conceptual views illustrating one example of the mobile terminal, viewed from different directions.
Figure 1C:
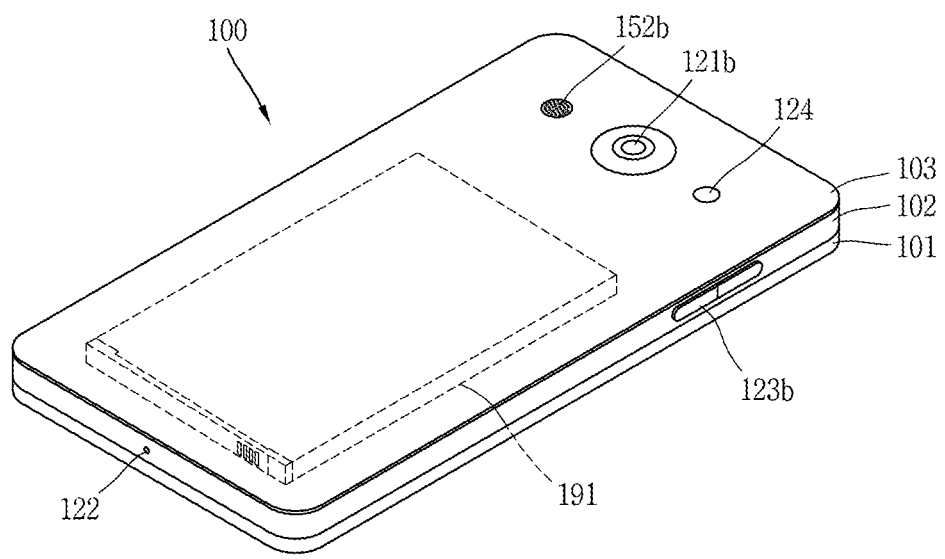

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 controls some or all of the components illustrated in FIG. 1A according to the execution of an application program that have been stored in the memory 170. In addition, the controller 180 may control at least two of those components included in the mobile terminal to activate the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Prior to describing various embodiments implemented through the mobile terminal 100, each of those components will be described hereinafter, with reference to FIG. 1A.

The broadcast receiving module 111 receives broadcast signals and/or broadcast associated information from an external broadcast management server (or other network entity) via a broadcast channel. The broadcast channel may include a satellite channel and/or a terrestrial channel. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), Wideband CDMA (WCDMA), High Speed Downlink Packet access (HSDPA), High Speed Uplink Packet Access (HSUPA), Long Term Evolution (LTE), LTE-advanced (LTE-A) and the like).

Examples of the wireless signals include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LET-A, and the like, as part of a mobile communication network, the wireless Internet module 113 performs such wireless Internet access and may be understood as a type of the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

The input unit 120 may be configured to permit various types of inputs to the mobile terminal 120. Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operation of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor can sense a touch (or a touch input) applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image is comprised of a left image (a left eye image) and a right image (a right eye image). According to how left and right images are combined into a 3D stereoscopic image, the 3D stereoscopic imaging method is divided into a top-down method in which left and right images are disposed up and down in a frame, an L-to-R (left-to-right, side by side) method in which left and right images are disposed left and right in a frame, a checker board method in which fragments of left and right images are disposed in a tile form, an interlaced method in which left and right images are alternately disposed by columns and rows, and a time sequential (or frame by frame) method in which left and right images are alternately displayed by time.

Also, as for a 3D thumbnail image, a left image thumbnail and a right image thumbnail are generated from a left image and a right image of the original image frame, respectively, and then combined to generate a single 3D thumbnail image. In general, thumbnail refers to a reduced image or a reduced still image. The thusly generated left image thumbnail and the right image thumbnail are displayed with a horizontal distance difference therebetween by a depth corresponding to the disparity between the left image and the right image on the screen, providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal. However, such teachings with regard to a particular type of mobile terminal will generally apply to other types of mobile terminals as well.

Here, considering the mobile terminal 100 as at least one assembly, the terminal body may be understood to indicate the assembly.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. For example, the display unit 151 may display execution screen information of an application program executing at the mobile terminal 100 or user interface (UI) and graphic user interface (GUI) information in response to the execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver for transferring call sounds to a user's ear and the second audio output module 152b may be implemented in the form of a loud speaker to output alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output module 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side due to the touch screen or rear input unit replacing at least some functions of the first manipulation unit 123a provided on the front of the terminal body, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Meanwhile, a mobile terminal may be configured as a device which is wearable on a human body. Such devices go beyond the usual technique of a user grasping the mobile terminal using his hand. Examples of the wearable device include a smart watch, a smart glass, a head mounted display (HMD), and the like. Hereinafter, examples of mobile terminals extending to the wearable devices will be described.

A typical wearable device can exchange data with (or cooperate with) another mobile terminal 100. The short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit at least part of data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Hereinafter, description will be given of a head mounted display (HMD) of wearable devices in relation to the present invention, with reference to the accompanying drawings.

Figure 2A:
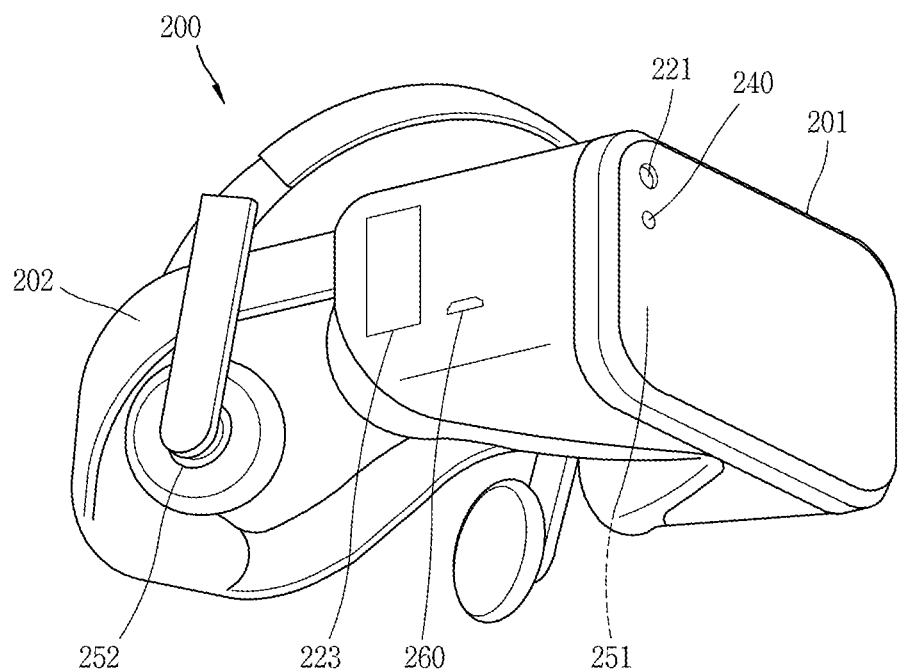
FIGS. 2A and 2B are conceptual views illustrating a head mounted display (HMD) in accordance with the present invention.
Figure 2B:
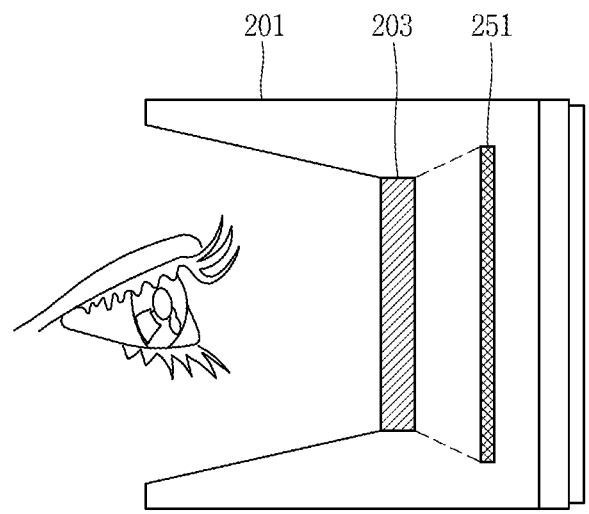

FIGS. 2A and 2B are conceptual views illustrating an HMD in accordance with the present invention.

An HMD 200 according to the present invention may include at least one of those components illustrated in FIG. 1A.

For example, the HMD 200 may include at least one of a wireless communication unit, an input unit (e.g., a user input unit 223, a microphone, etc.), a sensing unit 240, an output unit (e.g., a display unit 251, an audio output module 252, etc.), an interface unit 260, a memory, a controller 280 and a power supply unit. It is understood that all of the illustrated components are not requirements for implementing the HMD. Thus, the HMD 200 described herein may alternatively have greater or fewer components.

Referring to FIG. 2A, the HMD 200 according to the present invention may be wearable on a head portion (a face, a head or the like) of a user (human body), and for this include a frame part (case, housing, cover, etc.). The frame part may be made of a flexible material to facilitate for wearing the HMD 200. FIG. 2A exemplarily illustrates that the frame part includes a first frame 201 and a second frame 202 made of different materials from each other.

As one example, the first frame 201 may serve to provide an installation space for at least one of the components illustrated in FIG. 1A, and the second frame 202 may serve to support (or fix) the frame 201 on the user's head portion.

The frame part may also be referred to as a main body (or an HMD main body) or a body (or an HMD body). Here, the HMD main body (or the HMD body) may be understood to indicate at least one assembly. Hereinafter, the HMD main body is represented by the same reference numeral 200 as the HMD.

Considering the frame part including the first frame 201 and the second frame 202 as one HMD main body, the main body of the HMD according to the present invention may be implemented in various forms. In detail, the main body may include a plurality of surfaces forming preset angles. The plurality of surfaces refer to surfaces located at an outer side of the main body of the HMD 200. From this perspective, the plurality of surfaces may refer to surfaces (outer surfaces) of the HMD 200. Each of the plurality of surfaces may be in a flat or curved shape.

The main body (frame part) may be supported on the user's head portion, and provide an installation space for various components. As illustrated, in the first frame 201 may be disposed electronic components, such as a camera 221, a display unit, a user input unit 223, a controller 280, a sensing unit 240, an interface unit 260, and the like.

In the second frame 202 may be disposed electronic components, such as an audio output module 252 and the like. By way of non-limiting example only, the components illustrated in FIG. 1A and components required for the HMD may be arranged in various manners in the first frame 201 and the second frame 202 according to a user selection. That is, the HMD 200 described herein may include greater or fewer components than the illustrated components.

The controller 280 of the HMD 200 may be configured to control various electronic components provided in the HMD 200. The controller 280 may be understood as a component corresponding to the controller 180 illustrated in FIG. 1A.

As illustrated in FIG. 2A, the camera 221 may be provided at the main body 200. For example, the camera 221 may be disposed at one surface (e.g., a front surface) of the HMD main body 200. The camera 221 may be located adjacent to at least one of left and right eyes, to capture (receive, input) a front image. Since the camera 221 is disclosed to face the front side at a position adjacent to the eye, the camera 221 may obtain an image of the front side that the user views.

The drawing exemplarily illustrates one camera 221, but the present invention may not be limited to this. A plurality of cameras 221 may be provided to obtain a stereoscopic image.

The HMD 200 may include the sensing unit 240. The sensing unit 240, as illustrated in FIG. 1A, may include a proximity sensor, an illumination sensor, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, the camera 121), a microphone 122, a battery gauge, an environment sensor (for example, a barometer, a hygrometer, a thermometer, a radiation detection sensor, a thermal sensor, and a gas sensor, among others), a chemical sensor (for example, an electronic nose, a health care sensor, a biometric sensor, and the like), and the like.

As one example, the controller 180 may sense a movement (motion) of the HMD 200 by using a gyroscope sensor, a G-sensor, a motion sensor and the like included in the sensing unit 240. As another example, the controller 280 may sense a subject which moves close to the HMD main body 200 by using a proximity sensor, an illumination sensor, an infrared sensor, an ultrasonic sensor, an optical sensor and the like included in the sensing unit 240.

The HMD 200 may include a user input unit 223 that the user manipulates to input a control command. Any method or technique can be employed for the user input unit 223 so long as it can be operated by the user in a tactile manner, such as pushing, touching and the like. In the drawing, the user input unit 223 of a push type or a touch type is provided at the frame part.

Also, the HMD 200 may be provided with a microphone (not illustrated) that receives sound and processes it into an electric audio data, and an audio output module 252 that outputs an audio. The audio output module 252 may be configured to transfer an audio in a general audio output manner or through bone conduction. In case where the audio output module 252 is implemented in the bone conduction manner, when the user wears the HMD 200, the audio output module 252 may be closely adhered on the head portion and vibrates a skull to transfer an audio.

As illustrated in FIG. 2B, a display unit 252 may be mounted on the frame part to output screen information (e.g., image, video, etc.) at the front of the user's eyes. The display unit 252 may be arranged to correspond to at least one of the user's left and right eyes, such that the screen information can be output in front of the user's eye when the user wears the HMD 200. That is, the display unit 251 may be located in from of (or to cover or face) at least one of the user's left and right eyes.

As one example, the display unit 251 of the HMD according to the present invention may be located in the HMD main body 200. In detail, the display unit 251 may be disposed in the HMD 200, and located at a position that the user's eyes face when the user wears the HMD 200 on the head portion.

The HMD 200 may also include a lens unit 203 that allows the user to view screen information output on the display unit 251 provided in the HMD main body. That is, the HMD 200 disclosed herein may be configured such that screen information (or light) output on the display unit 251 can be transmitted to the user's eyes through the lens unit 203.

For example, the lens unit 203 may be arranged to correspond to at least one of the user's both eyes (i.e., left and right eyes). Also, the lens unit 203 may be arranged between the at least one of the user's eyes and the display unit 251 when the user wears the HMD 200 on the head portion.

The lens unit 203 may have a viewing angle which varies according to a distance between the user's eye and the display unit 251, and thus may be configured to have a variable position according to a user's control. Also, the lens unit 203 may be configured as a concave lens, a convex lens or a combination thereof.

The display unit 251 may project an image to the user's eye by using a prism. Additionally, in order to allow a user to see the projected image and a general front view (that is, a range that the user can see through the eyes), the prism may be transparent.

In this manner, an image output through the display unit 251 may be displayed in a manner of overlapping the general front view. The HMD 200 may provide augmented reality (AR) superimposing a virtual image on a real image or a background and displaying it as one image by using characteristics of such a display.

That is, the display unit 251 may be configured to prevent a transmission of external light therethrough for implementing virtual reality (VR), or allow for the transmission of external light therethrough for implementing augmented reality (AR).

Although not illustrated, the display unit 251 which face the at least one of the left eye and the right eye may be detachably provided at the frame part.

The display unit 251 may also be a display unit of an external mobile terminal. The HMD man body 200 (frame part) may be configured such that the external mobile terminal can be detachably coupled thereto. The HMD main body 200 may be electrically connected with the external mobile terminal. When the HMD main body 200 is electrically connected with the external mobile terminal, the controller 280 of the HMD 200 may control the external mobile terminal.

If the external mobile terminal is mounted to the HMD main body 200, the configuration of the camera 221, the sensing unit 240, the display unit 251, the controller 280 and the like provided in the HMD 200 may be replaced with a configuration of a camera, a sensing unit, a display unit, a controller and the like included in the external mobile terminal.

However, for a weight reduction, description will be given of an example that the HMD 200 includes the display unit 251, other than the case where the external mobile terminal is attached to the HMD main body 200.

Hereinafter, each component provided in the main body of the HMD 200 will be described in more detail.

Among others, the wireless communication unit may include at least one module which allows for wireless communications between the HMD 200 and another HMD, between the HMD 200 and a mobile terminal (or a stationary terminal), between the HMD 200 and a control device, between the HMD 200 and a camera which is externally installed and can perform wireless communication, or between the HMD 100 and an external server.

The wireless communication unit may also include at least one module for connecting the HMD 200 to at least one network.

The wireless communication unit may include at least one of a broadcast receiving module, a mobile communication module, a wireless Internet module, a short-range communication module, and a position-information module. Those modules may be understood by the description of the wireless communication unit illustrated in FIG. 1A.

However, without a limit thereto, the mobile terminal 100 and the HMD 200 disclosed herein may perform data transmission and reception in a wired communication manner through the interface unit 160 of the mobile terminal 100 and the interface unit 260 of the HMD 200.

Figure 3:
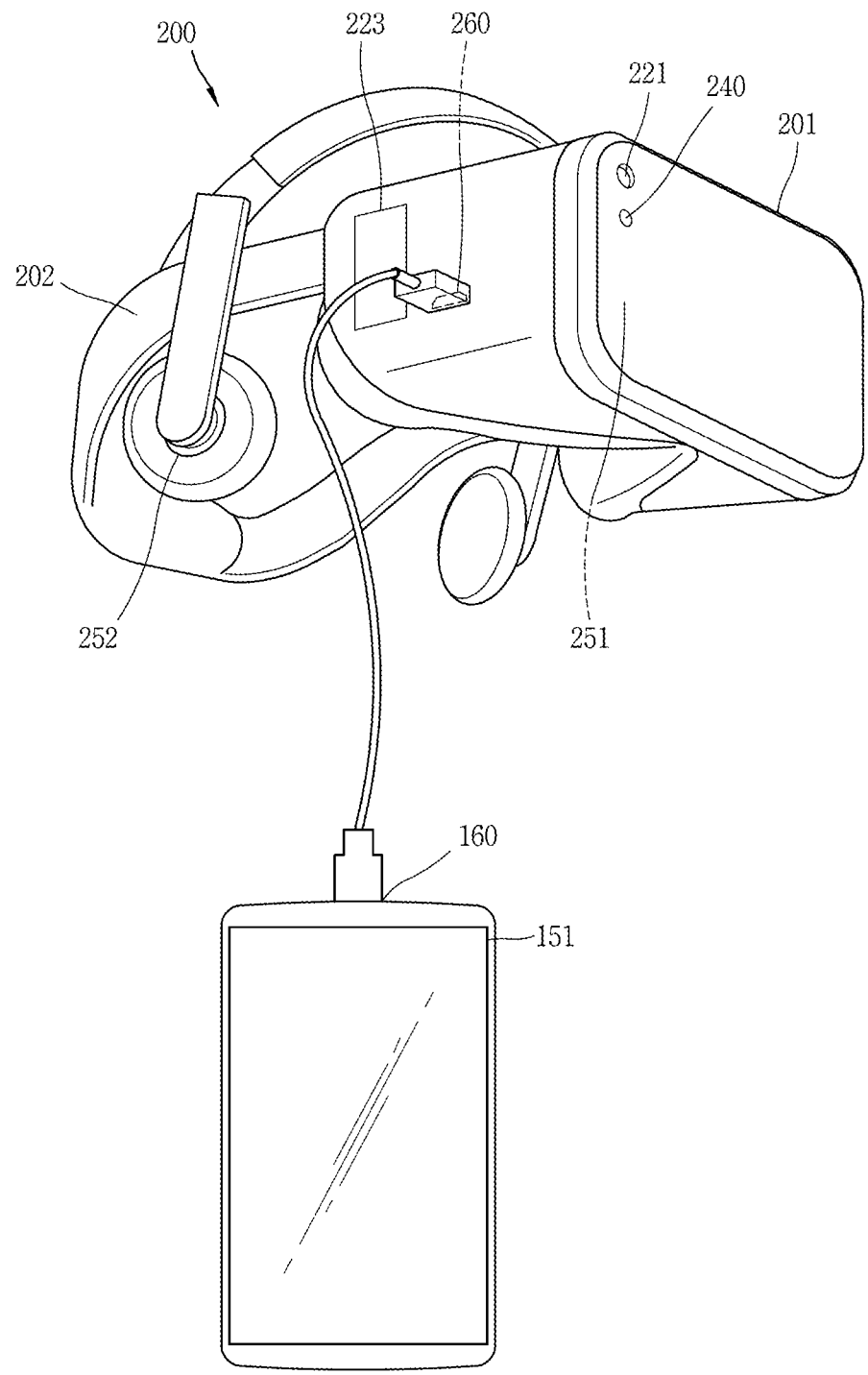
FIG. 3 is a conceptual view illustrating one exemplary embodiment in which a mobile terminal and an HMD are connected to perform wired communication therebetween, in accordance with the present invention.

FIG. 3 is a conceptual view illustrating one exemplary embodiment in which a mobile terminal and an HMD are connected to perform wired communication in accordance with the present invention.

As illustrated in FIG. 3, the HMD 200 disclosed herein may include the interface unit 260. The interface unit 260 may be provided at the first frame 201 of the HMD main body 200, for example.

The interface unit 260 of the HMD 200 may serve as an interface with various types of external devices (e.g., the mobile terminal 100) that can be coupled to the HMD 200. The interface unit 260 may allow for receiving data from an external device, transferring supplied power to each component in the HMD 200, or transmitting data in the HMD 200 to an external device (the mobile terminal 100). The interface unit 260, for example, may include any of wired or wireless ports, external power supply ports, wired or wireless data ports, memory card ports, ports for connecting a device having an identification module, audio input/output (I/O) ports, video I/O ports, earphone ports, and the like.

As illustrated in FIG. 3, the interface unit 260 of the HMD 200 and the interface unit 160 of the mobile terminal 100 may be connected to each other through a wired cable for allowing communication therebetween. For example, the interface unit 260 of the HMD 200 and the interface unit 160 of the mobile terminal 100 may be wired data ports. Types of ports of the interfaces 160 and 260 may be the same as or different from each other.

The HMD 200 connected with the mobile terminal 100 in the wired manner may be controlled by the controller 180 of the mobile terminal 100. Also, the controller 280 of the connected HMD 200 may control the HMD 200 based on data (e.g., a control command) received from the mobile terminal 100 through the wired cable.

This specification will describe an example in which the HMD 200 is controlled by the controller 180 of the mobile terminal 100 connected thereto in the wired manner. However, it will be obvious that operations performed by the controller 180 of the mobile terminal 100 can be performed by the controller 280 of the HMD 200.

The mobile terminal 100 which is connected to the HMD 200 in a wireless or wired manner for allowing data transmission and reception may serve as a controller (or a control device, a control member) controlling the HMD 200.

Figure 4:
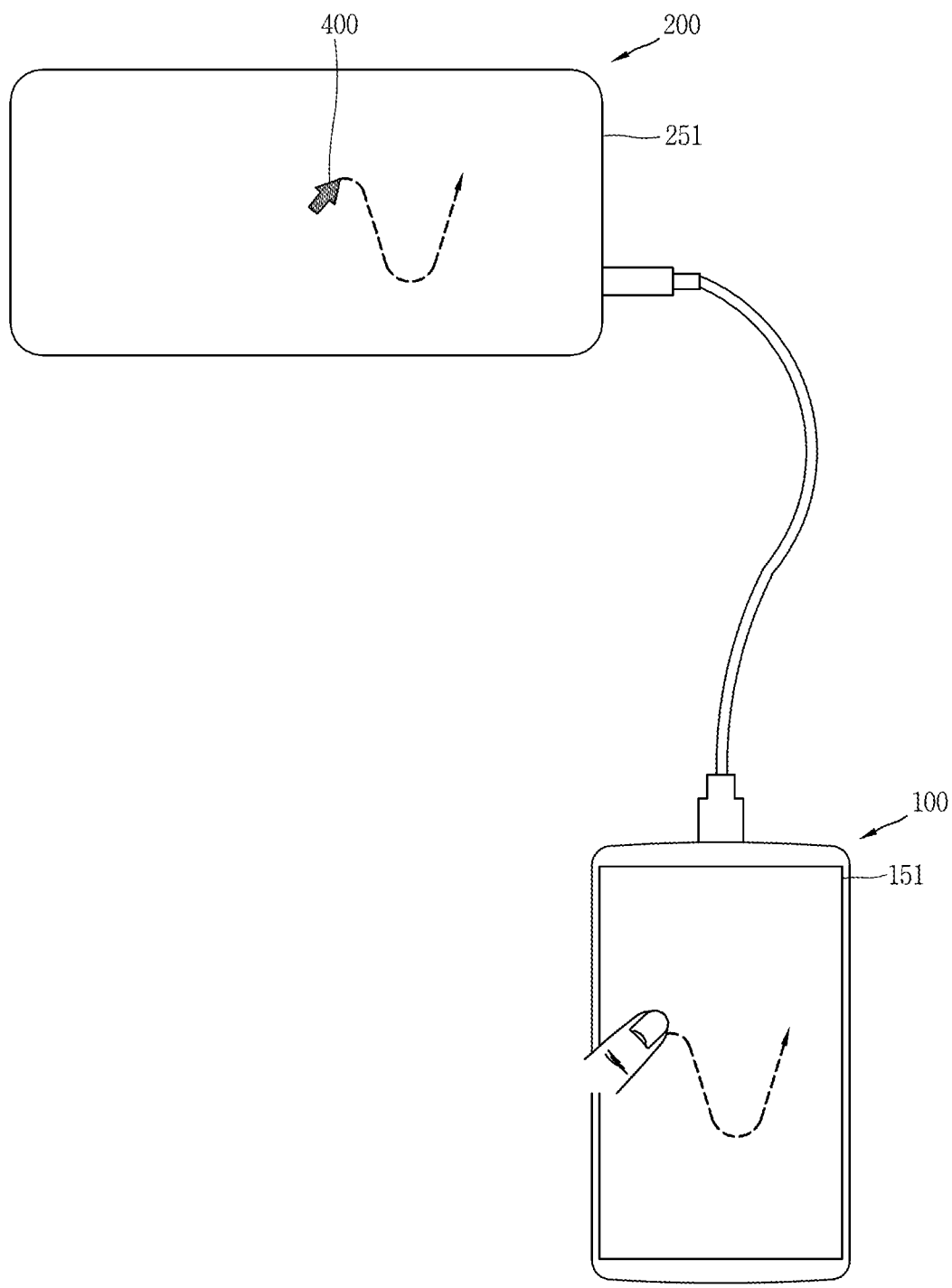
FIG. 4 is a conceptual view illustrating a method of controlling an HMD using a mobile terminal in accordance with one exemplary embodiment of the present invention.

FIG. 4 is a conceptual view illustrating a method of controlling an HMD using a mobile terminal in accordance with one exemplary embodiment disclosed herein.

As aforementioned, the HMD 200 disclosed herein may be controlled by the mobile terminal 100 which is connected thereto for allowing wired/wireless communication. Hereinafter, description will be given of an example that the HMD 200 and the mobile terminal 100 are connected with each other through a wired cable for allowing data communication therebetween.

For example, as illustrated in FIG. 4, a cursor 400 may be output on the display unit 251 of the HMD 200. The cursor 400 may be output on the display unit 251 of the HMD 200 when the HMD 200 is turned on, when the HMD 200 operates in a specific operation mode, or on the basis of a user request.

As one example, the user request may include a user input applied to the user input unit 223 of the HMD 200, a user input (or touch) applied to the touch screen 151 of the mobile terminal 100 connected to the HMD 200 through the wired cable, a preset motion made by the main body of the mobile terminal 100 or the HMD main body 200 in response to an external force, and the like.

The cursor 400 output on the display unit 251 of the HMD 200 may be movable by the mobile terminal 100 connected through the wired cable. For example, when a preset touch (e.g., a drag touch) is applied to the touch screen 151 of the mobile terminal 100, the controller 180 may control the display unit 251 of the HMD 200 in a manner that the cursor 400 is moved in response to the touch.

In case where the controller 280 of the HMD 200 is implemented to operate independent of the controller 180 of the connected mobile terminal 100, when a preset touch is applied to the touch screen 151, the controller 180 of the mobile terminal 100 may transmit a signal related to the preset touch to the HMD 200 through the interface unit 160.

Afterwards, the controller 280 of the HMD 200 may control the cursor 400 output on the display unit 251 to be moved, based on the signal related to the touch.

However, the following description will be given of an example that components included in the HMD 200 are controlled by the controller 180 of the mobile terminal, for the sake of explanation. Such operation may refer to that the HMD 200 connected in the wired manner is coupled as one component of the mobile terminal 100 and driven (controlled).

FIG. 4 illustrates the example of moving the cursor 400 output on the display unit 251 of the HMD 200 by using the mobile terminal 100, but the present invention may not be limited to this.

In accordance with the present invention, a 3D image formed as a stereoscopic space (hereinafter, referred to as 'virtual space') may be output on the display unit 251 of the HMD 200.

Figure 5A:
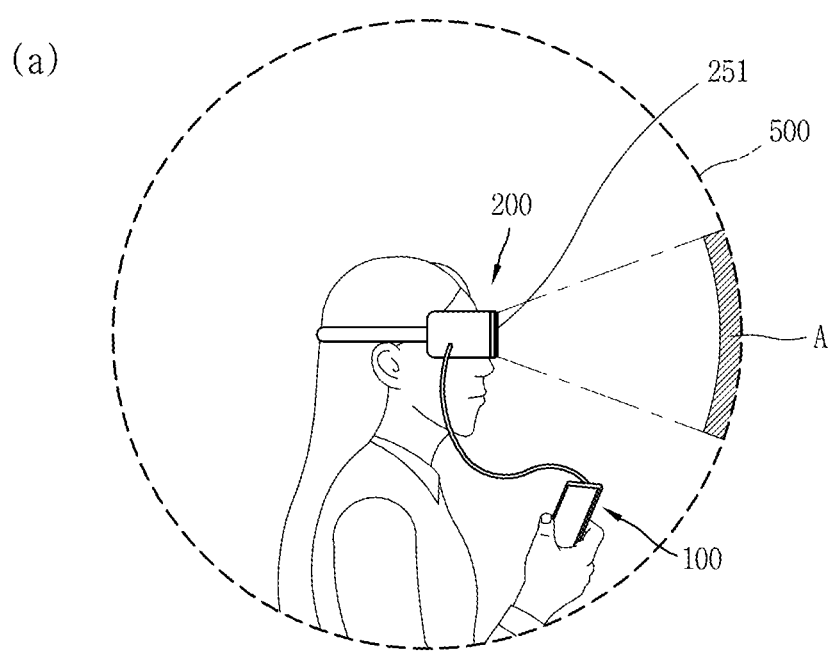
FIGS. 5A and 5B are conceptual views illustrating a virtual space in accordance with the present invention.
Figure 5A:
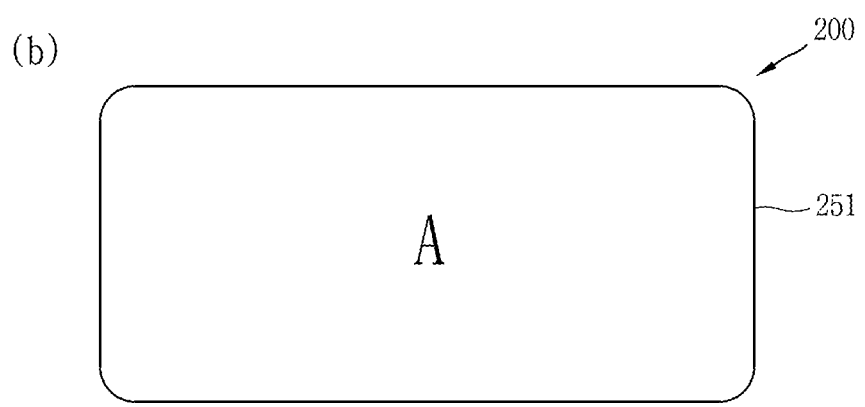
Figure 5B:
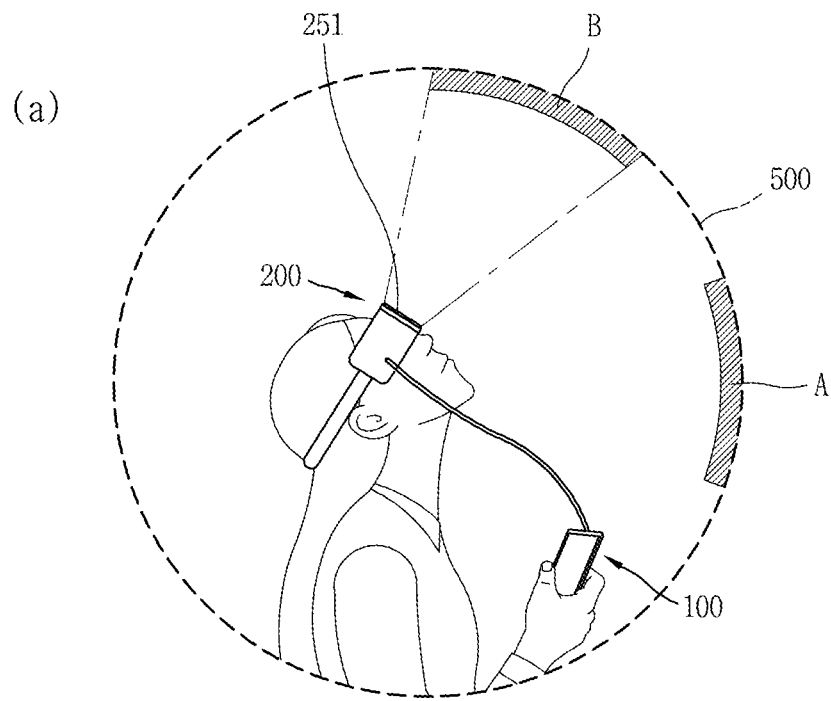
Figure 5B:
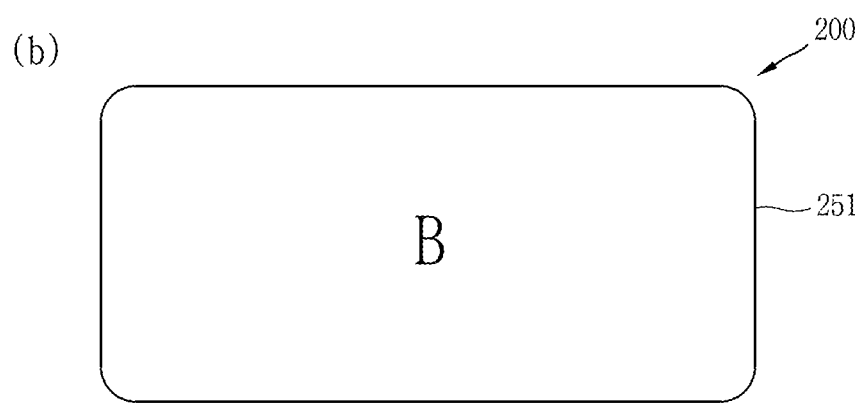

FIGS. 5A and 5B are conceptual views illustrating a virtual space in accordance with the present invention.

A virtual space 500 (or a virtual space image) disclosed herein may refer to a 3D image which is formed omnidirectionally (e.g., at 360°) based on a user wearing the HMD 200. The virtual space 500 may be a stereoscopic space image (or a stereoscopic image or 3D image) which is rendered for the user wearing the HMD 200 to recognize that the user is located in a specific space (or a virtual space). For example, as illustrated in (a) of FIG. 5A, the user wearing the HMD 200 may recognize that he or she is present within the virtual space 500.

The controller 180 of the mobile terminal 100, as illustrated in (a) and (b) of FIG. 5A, may output one area (e.g., a first area A) of the virtual space 500 on the display unit 251 of the HMD 200 connected in the wired manner, by using information related to the virtual space. The information related to the virtual space may refer to the very 3D image or at least one data configuring (included in) the 3D image.

In detail, when a request for outputting the virtual space is received, the controller 180 of the mobile terminal 100 may output the one area A of the output-requested virtual space on the display unit 251.

Meanwhile, the one area A of the virtual space output on the display unit 251 of the HMD 200 may change in response to a movement of the user wearing the HMD 200.

For example, the sensing unit 240 of the HMD 200 may sense the user's movement when the head portion of the user wearing the HMD 200 is moved. The movement may be carried out while the one area A of the virtual space 500 is output on the display unit 251 of the HMD 200.

The movement described herein should be understood to indicate a movement (or a motion), a rotation or a combination thereof.

Afterwards, the sensing unit 240 (or the controller 280 of the HMD 200) may transmit information related to the movement to the controller 180 of the mobile terminal 100 which is connected to the HMD 200 in the wired manner. The controller 180 of the mobile terminal 100 may then control the display unit 251 of the HMD 200 to output another area B, which is different from the one area A, of the virtual space 500, on the basis of the transmitted information related to the movement.

For example, as illustrated in (a) of FIG. 5B, while the one area A of the virtual space 500 is output on the display unit 251, when the HMD main body 200 is moved (or rotated), the controller 180 of the mobile terminal 100, as illustrated in (a) and (b) of FIG. 5B, may control the display unit 251 of the HMD 200 to output the another area B, different from the one area A, of the virtual space 500, in response to the movement.

With the configuration, the present invention can provide a user interface for the user using the HMD 200 to feel that he or she is actually moving in the virtual space.

Hereinafter, description will be given in more detail of a method of controlling an HMD connected to a mobile terminal in a wired manner by using the mobile terminal.

Figure 6:
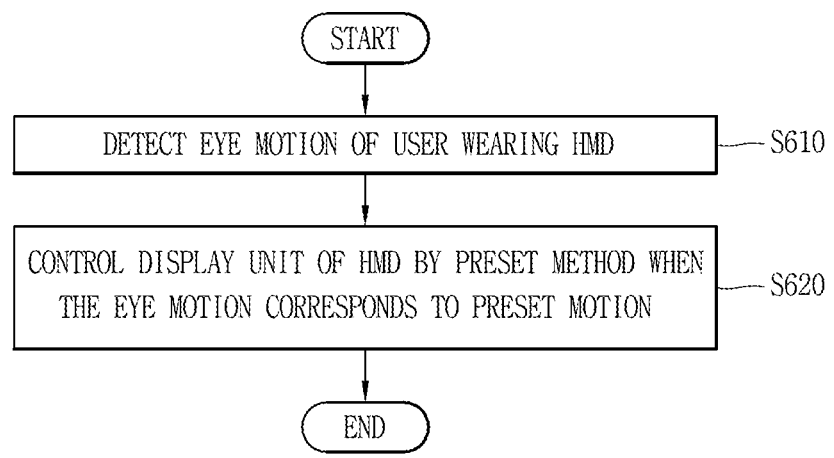
FIG. 6 is a flowchart illustrating a representative control method in accordance with the present invention.
Figure 7:
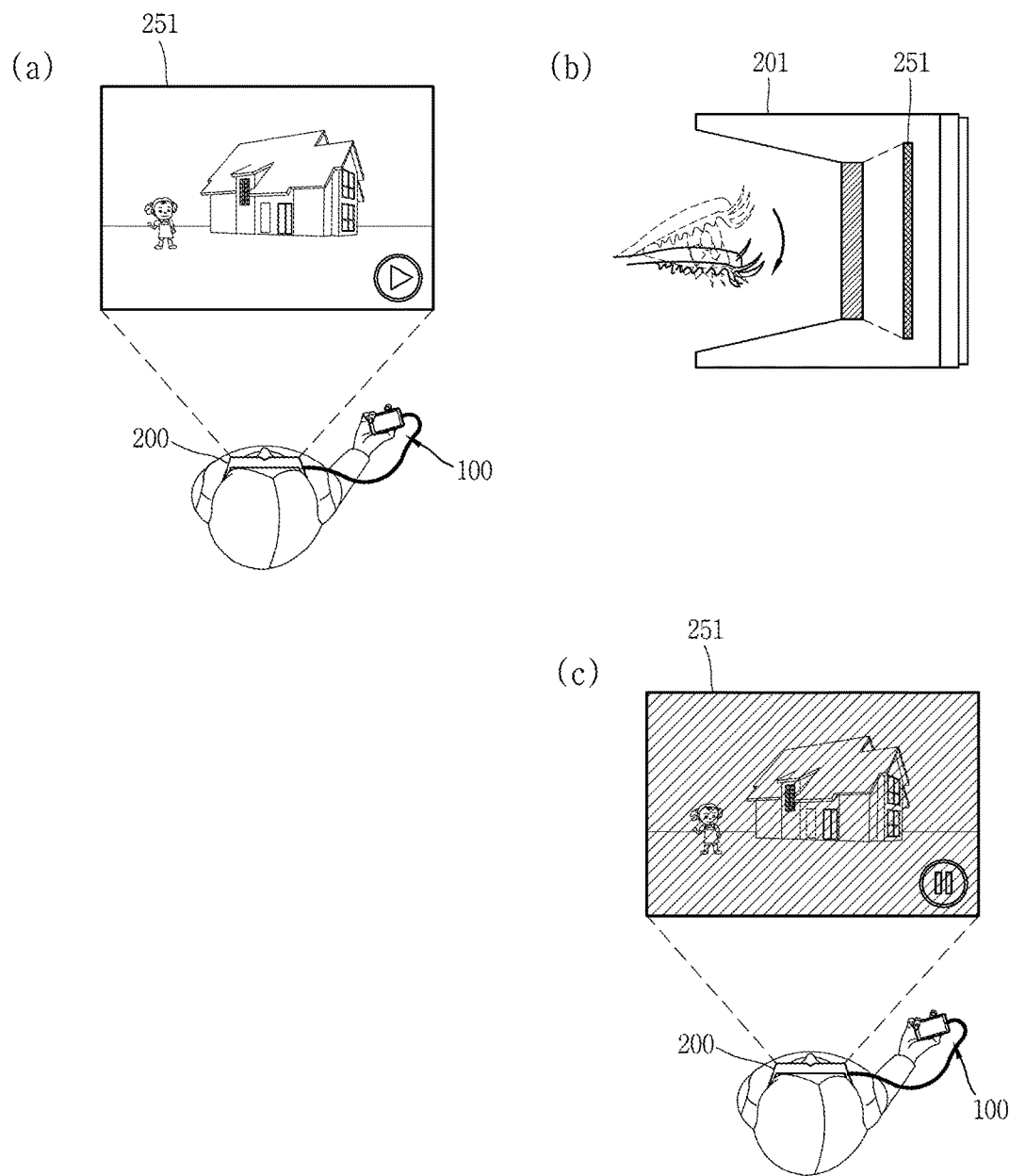
FIG. 7 is a conceptual view illustrating the control method illustrated in FIG. 6.

FIG. 6 is a flowchart illustrating a representative control method in accordance with the present invention, and FIG. 7 is a conceptual view illustrating the control method illustrated in FIG. 6.

First, screen information (or a part of a virtual space) is output on the display unit 251 of the HMD 200 according to a user request. The screen information may include every type of screen information which is outputtable on the mobile terminal 100 or the HMD 200. For example, the screen information may include a part of the virtual space (or virtual space image, 3D image, etc.), an execution of a specific application, a video, an image and the like.

Meanwhile, in the present invention, an eye motion (or an eyes motion) of the user who wears the HMD 200 is detected (S610). In detail, the controller 180 of the mobile terminal 100 may sense (detect, extract, etc.) the eye motion of the user (or the user's eyes) wearing the HMD 200, using the sensing unit 240 provided in the HMD 200.

As one example, the sensing unit 240 of the HMD 200 disclosed herein may be provided in the first frame 201 and sense the eye motion of the user wearing the HMD 200. For example, the sensing unit 240 of the HMD 200 disclosed herein may be a camera, which captures the eyes of the user wearing the HMD 200.

As one example, the controller 180 of the mobile terminal 100 (or the controller 280 of the HMD 200) may receive a captured image of the user's eyes using the camera of the HMD 200, and sense (detect) the eye motion of the user using the received image.

The sensing of the user's eye motion may be carried out using an image analyzing algorithm, for example. The method of detecting the user's eye motion is a generally known technology, detailed description thereof will thus be omitted.

Afterwards, when the detected eye motion corresponds to a preset motion (or operation), the display unit 251 of the HMD 200 is controlled by a preset method (S620). In detail, the controller 180 of the mobile terminal 100 may determine whether or not the eye motion detected through the sensing unit 240 of the HMD 200 corresponds to the preset motion. Here, the preset motion (or the preset operation) may be a motion that the user closes the eyes (or eye) (in other words, a motion that the user of the HMD 200 closes the eyes (or eye) while opening the eyes (or eye)).

The preset motion may also include a motion that the user maintains the eye-closed state for a predetermined period of time or more (in other words, a motion that the user closes the eyes for a predetermined period of time or more, or does not open the eyes for a predetermined period of time or more after closing the eyes).

Hereinafter, for the sake of explanation, description will be given under assumption that the preset motion is a motion that the user closes the eyes. However, in the related description, the preset motion may be a motion that the user keeps closing the eyes for a predetermined period of time or more. Easily speaking, the preset motion may be understood as a motion that the user closes the eyes for taking a break.

The controller 180 may control the display unit 251 of the HMD 200 by the preset method when the preset motion is detected through the sensing unit 240.

Here, the preset method may refer to a control method linked to (associated with) the preset motion, and may include various control methods.

For example, when a motion that the user wearing the HMD 200 closes the eyes is detected, the controller 180 may reduce output brightness of the display unit 251 of the HMD 200. Here, the reducing of the output brightness may include at least one of reducing intensity of a backlight configuring the display unit 251 of the HMD 200, reducing an attribute, such as brightness/saturation, etc., related to the output of the display unit 251, or reducing output intensity of a wavelength included in a specific wavelength range (e.g., typically, a wavelength range emitting blue light). This is for reducing eyestrain.

As illustrated in (a) of FIG. 7, while screen information is output at a first output brightness on the display unit 251 of the HMD 200, as illustrated in (b) of FIG. 7, the sensing unit 240 of the HMD 200 may detect whether the user's eye motion is a preset motion (E.g., a motion of closing the eyes).

In this instance, as illustrated in (c) of FIG. 7, the controller 180 may adjust (set) the output brightness of the display unit 251 of the HMD 200 to a second output brightness, which is lower than the first output brightness, on the basis of the preset motion.

As another example, when the screen information currently output on the display unit 251 of the HMD 200 is a video, the controller 180 may stop the output (reproduction) of the video, in response to a detection of a motion that the user wearing the HMD 200 closes the eyes.

As illustrated in (a) of FIG. 7, when screen information currently output on the display unit 251 of the HMD 200 is a video, the controller 180, as illustrated in (b) of FIG. 7, may stop the output (or reproduction) of the video, as illustrated in (c) of FIG. 7, in response to the detection of the motion that the user wearing the HMD 200 closes the eyes.

Although not illustrated, the screen information output on the display unit 251 of the HMD 200 may vary based on a movement (motion) of the HMD 200.

For example, when the screen information is a part of a virtual space (or a virtual space image), the controller 180 of the mobile terminal 100 may control the display unit 251 of the HMD 200 to output another part, different from the part of the virtual space, in response to a movement of the HMD 200 sensed by the sensing unit 240 of the HMD 200 (or the sensing unit 140 of the mobile terminal 100).

Here, when the HMD 200 is moved while the user wearing the HMD 200 closes the eyes (in other words, while the user's eye motion corresponding to the preset motion is maintained), the controller 180 may not vary but maintain (or fix) the screen information (e.g., the part of the virtual space) currently output on the display unit 251 of the HMD 200.

In other words, the controller 180 of the mobile terminal 100 may fix (or maintain) the screen information currently output on the display unit 251 of the HMD 200, without change, when the user moves the head portion with the HMD 200 worn while closing the eyes.

Also, when the user's eye motion detected through the sensing unit 240 of the HMD 200 corresponds to the preset motion, the controller 180 of the mobile terminal 100 may output (reproduce, play) a specific music through the audio output module 152 of the mobile terminal 100 (the audio output module 252 of the HMD 200, or the interface unit 160 connected to a headset, an earphone, a speaker or the like to perform wired/wireless communication). For example, the specific music may be a music set by the user, or a music (or sound) which is selected for the user wearing the HMD 200 to feel comfortable.

With the configuration, the present invention can provide a UI/UX which is configured for the user wearing the HMD to take a break by a method optimized for the user.

Hereinafter, description will be given in more detail of various methods for controlling an HMD using a mobile terminal in accordance with the present invention, with reference to the accompanying drawings.

FIGS. 8, 9A, 9B, 9C, 10A and 10B are conceptual views illustrating a method of controlling an HMD using a mobile terminal in accordance with one exemplary embodiment of the present invention.

Figure 8:
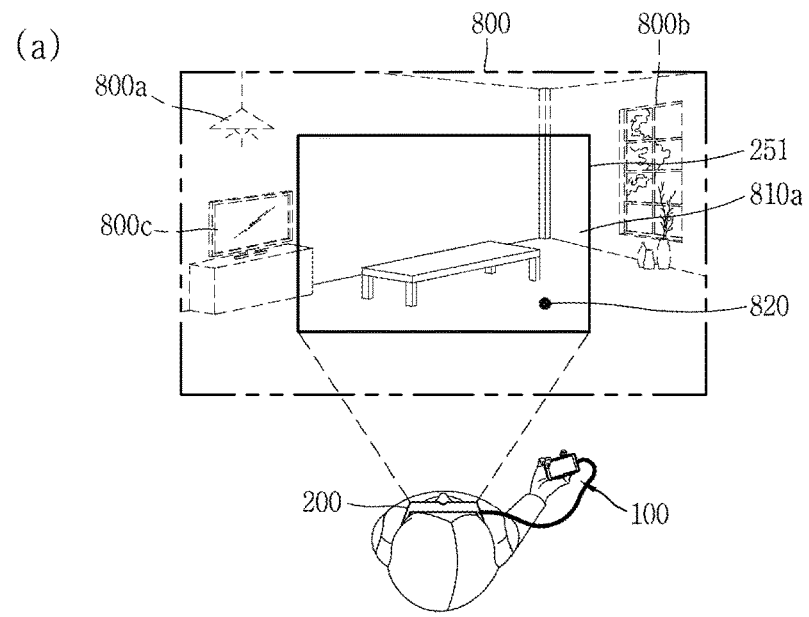
FIGS. 8, 9A, 9B, 9C, 10A and 10B are conceptual views illustrating a method of controlling an HMD using a mobile terminal in accordance with one exemplary embodiment of the present invention.
Figure 8:
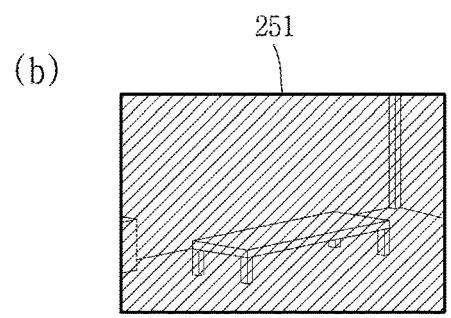
Figure 8:
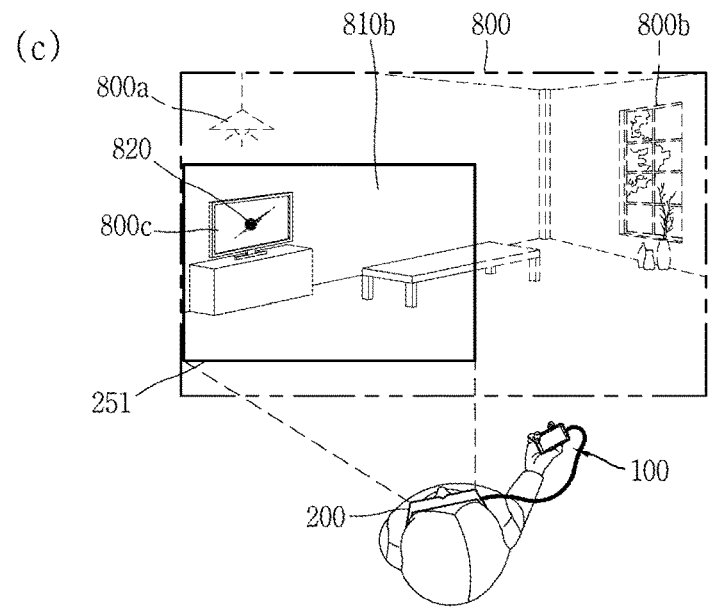

Referring to FIG. 8, as illustrated in (a) of FIG. 8, the controller 180 may control the display unit 251 of the HMD 200 to output a part 810a of a virtual space 800.

Meanwhile, the virtual space 800 may include therein at least one graphic object 800a, 800b and 800c each linked to a preset function. The preset function may include any type of function which is executable on the mobile terminal or the HMD. Examples of the preset function may include a brightness adjustment, an output of an image stored in the mobile terminal, an output of weather information, an output of a broadcast, an output of a home virtual space, and the like.

For example, the virtual space 800, as illustrated in (a) of FIG. 8, may include various graphic objects, such as a graphic object 800a linked to a brightness adjustment function, a graphic object 800b linked to a weather information output function, a graphic object 800c linked to a broadcast output function, and the like.

As aforementioned, the mobile terminal (or the HMD) disclosed herein may sense the eyes of the user wearing the HMD 200 through the sensing unit 240 of the HMD 200 (or the sensing unit 140 of the mobile terminal 100).

In this instance, as illustrated in (a) of FIG. 8, the controller 180 may output a point (or a cursor, a graphic object, etc.) 820 to correspond to the user's eyes on the display unit 251 of the HMD 200, on the basis of the user's eyes.

When it is sensed that the user views a specific graphic object (or when it is sensed that the user views the specific graphic object for a predetermined period of time or more, or when the terminal main body is moved along a preset motion while the user views the specific graphic object), the controller 180 may carry out a function linked to the specific graphic object. The movement of the terminal body may be sensed (or detected) through the sensing unit 140 of the mobile terminal 100.

Meanwhile, as illustrated in FIG. 8, when a part 810a, in which the at least one graphic object is not included (i.e., a portion without a graphic object linked to a preset function), of the virtual space 800 is continuously output on the display unit 251 of the HMD 200, the controller 180 of the mobile terminal 100, as illustrated in (b) of FIG. 8, may reduce output brightness of the display unit 251 of the HMD 200.

On the other hand, as illustrated in (c) of FIG. 8, when a part 810, which includes the at least one graphic object (e.g., 800c), of the virtual space 800 is output on the display unit 251 of the HMD 200, in response to the movement of the HMD 200, the controller 180 may reset the reduced output brightness of the display unit 251 of the HMD 200 back to the original output brightness.

For example, after setting the output brightness to a second output brightness lower than the first output brightness, which results from that the part without including the graphic object is continuously output on the display unit 251 of the HMD 200 currently set to the first output brightness, when the part including the at least one graphic object is output on the display unit 251 of the HMD 200, in response to the movement of the HMD 200, the controller 180 may change the output brightness of the display unit 251 of the HMD 200 from the second output brightness to the first output brightness.

The change from the second output brightness to the first output brightness may also be carried out when the user views the graphic object for a predetermined period of time or more, in addition to an output of a graphic object linked to at least one function on the display unit 251 of the HMD 200.

Besides, in the state that the display unit 251 of the HMD 200 has been set to the second output brightness lower than the first output brightness, when the terminal main body makes a preset motion (movement), the controller 180 may change the second output brightness to the first output brightness.

The preset motion may include a motion that the terminal main body is moved by a predetermined distance and then returns to its original position, a motion that the terminal main body is shaken a preset number of times, a motion that the terminal main body is rotated by a specific angle (e.g., a turning motion), a motion that the terminal main body is rotated by a predetermined angle and then returns to its original position, a motion that the terminal main body is moved in a specific direction, and the like.

Also, as illustrated in FIGS. 6 and 7, when the motion that the user closes the eyes is detected or when the screen information without including a graphic object linked to a specific function is output on the display unit 251 of the HMD 200 for a predetermined period of time or more, the controller 180 may control the display unit 251 of the HMD 200 to output second screen information (or a part of a second virtual space), which is different from first screen information (or a part of a first virtual space) currently output on the HMD 200.

The second screen information may be selectable by the user, and for example, correspond to an image (or a video) which is provided for the user to feel comfortable.

Meanwhile, the controller 180 of the mobile terminal 100 may determine (sense, detect, etc.) a motion (movement) of the HMD 200 through the sensing unit 240 of the HMD 200.

Figure 9A:
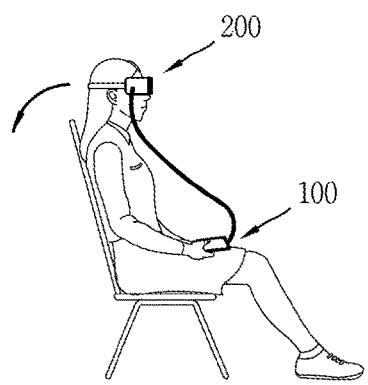
Figure 9A:
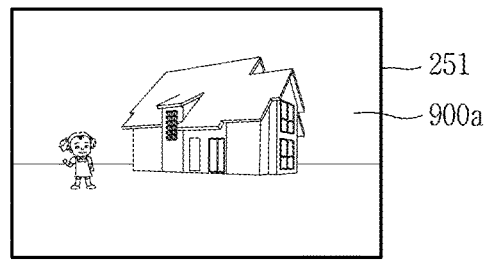
Figure 9A:
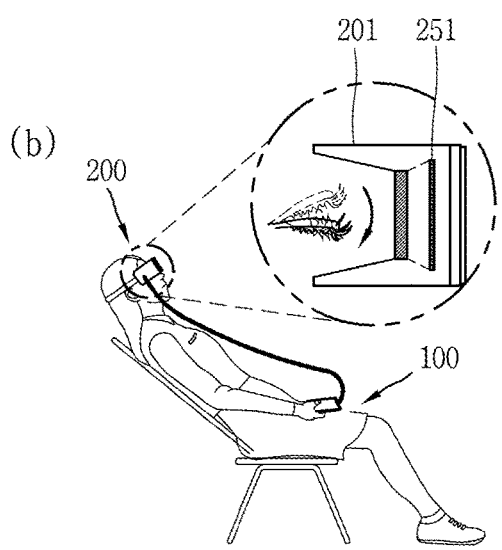
Figure 9A:
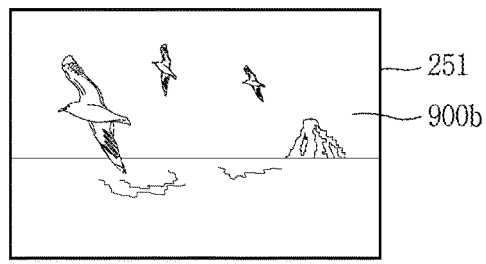
Figure 9A:
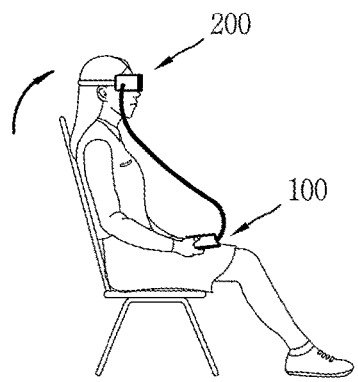
Figure 9A:
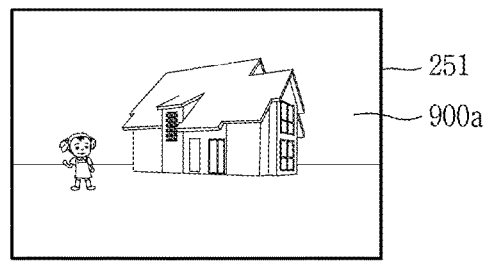

As illustrated in (a) of FIG. 9A, while first screen information 900*a* is output on the display unit 251 of the HMD 200, the controller 180, as illustrated in (b) of FIG. 9A, may control the display unit 251 of the HMD 200 to output second screen information 900*b*, different from the first screen information 900*a*, in response to the sensed movement of the HMD 200 corresponding to a preset motion.

The first screen information 900*a* may include any type of screen information which is outputtable on the mobile terminal 100 or the HMD 200. For example, the first screen information 900*a* may be a part of a virtual space, a default user interface, an execution screen of an application, a video or image stored in a memory of the mobile terminal or HMD or received from an external server, and the like.

The preset motion, for example, may include a motion (or movement) that the HMD 200 is moved by a specific distance or more in one direction (e.g., toward a rear side of the HMD 200), a motion that the HMD 200 is rotated by a specific angel or more in one direction, and the like.

Meanwhile, the present invention may not be limited to this. The controller 180, as illustrated in (b) of FIG. 9A, may control the display unit 251 of the HMD 200 to output the second screen information 900*b*, in response to a detection of a motion that the user wearing the HMD 200 closes the eyes after the HMD 200 is moved along the preset motion.

As aforementioned, the second screen information may be selectable by the user, and, for example, may correspond to an image (or video) that is provided for the user to feel comfortable.

Afterwards, while the second screen information 900*b* is output, as illustrated in (c) of FIG. 9A, when the HMD 200 is moved opposite to the preset motion, the controller 180 may control the display unit 251 of the HMD 200 to output the first screen information 900*a* again.

Figure 9B:
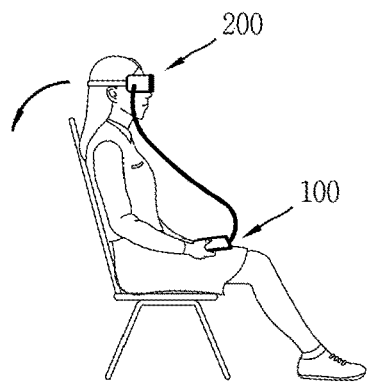
Figure 9B:
Figure 9B:
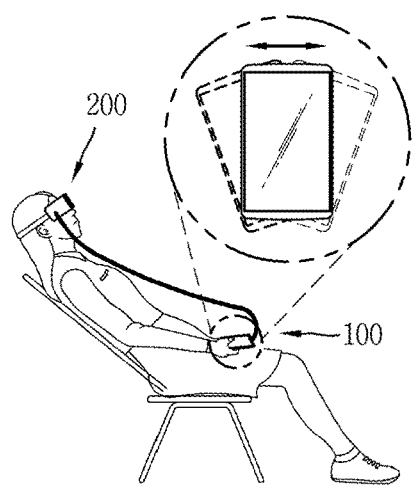
Figure 9B:
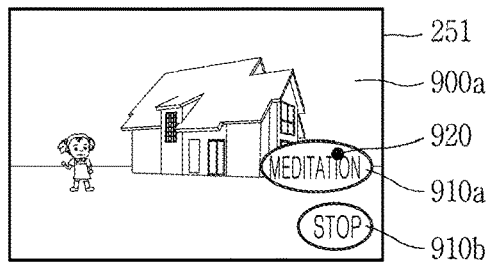
Figure 9B:
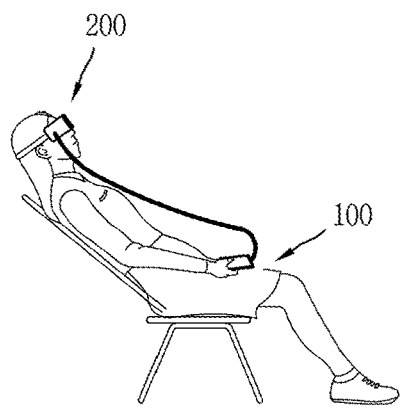
Figure 9B:
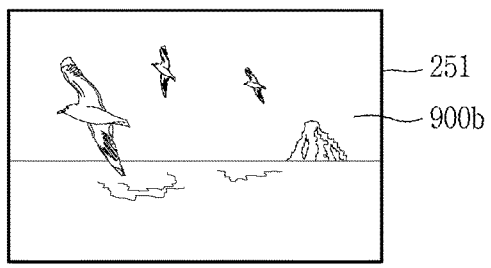

Meanwhile, as illustrated in (a) of FIG. 9B, while the first screen information 900*a* is output on the display unit 251 of the HMD 200, when the HMD 200 is moved along the preset motion, as illustrated in (b) of FIG. 9B, the controller 180 may control the display unit 251 of the HMD 200 to output a graphic object 910*a* linked to a function of outputting the second screen information 900*b*.

That is, when the HMD 200 is moved along the preset motion, the controller 180 may not output the second screen information 900*b* on the display unit 251 of the HMD 200, but output the graphic object 910*a* linked to the function of outputting the second screen information 900*b* to overlap the first screen information 900*a* while maintaining the output of the first screen information 900*a*.

Also, as illustrated in (b) of FIG. 9B, the controller 180 may control the display unit 251 of the HMD 200 to output a graphic object 910*b* linked to a specific function associated with the HMD 200, in response to a preset motion of the HMD 200.

The specific function associated with the HMD 200, for example, may include various functions, such as a home screen output function, an output-restricting function of currently-output screen information, a turn-off function of the HMD, and the like.

Afterwards, the controller 180, as illustrated in (b) of FIG. 9B, may detect the eyes of the user wearing the HMD 200 through the sensing unit 240 of the HMD 200. In this instance, the display unit 251 of the HMD 200 may output thereon a pointer 920 corresponding to the user's eyes.

While the user views the graphic object 910*a* with the eyes, when the terminal main body 100 makes a specific motion, the controller 180 may perform a function linked to (associated with) the graphic object 910*a*.

The motion of the main body of the terminal 100 may be sensed (detected) through the sensing unit 140 of the mobile terminal 100 (or the sensing unit 240 of the HMD 200). The specific motion may be a motion set according to a control command of selecting the pointer. Examples of the specific motion may include a motion that its terminal main body is moved by a predetermined distance and then returns to the original position, a motion that the terminal main body is shaken a preset number of times, a motion that the terminal main body is rotated by a specific angle (e.g., a turning motion), a motion that the terminal main body is rotated by a predetermined angle and then returns to its original position, a motion that the terminal main body is moved in a specific direction, and the like.

For example, as illustrated in (b) of FIG. 9B, while the pointer 920 output to correspond to the user's eyes is located on the graphic object 910*a* linked to the function of outputting the second screen information 900*b*, when the terminal main body 100 makes the specific motion, as illustrated in (c) of FIG. 9B, the controller 180 may control the display unit 251 of the HMD 200 to output the second screen information 900*b*, different from the first screen information 900*a*.

As another example, while the pointer 920 output to correspond to the user's eyes is located on the graphic object 910*a* linked to the function of outputting the second screen information 900*b*, when a motion that the user wearing the HMD 200 closes the eyes is detected, the controller 180 may output the second screen information 900*b* on the display unit 251 of the HMD 200, or reduce the output brightness of the HMD 200.

Figure 9C:
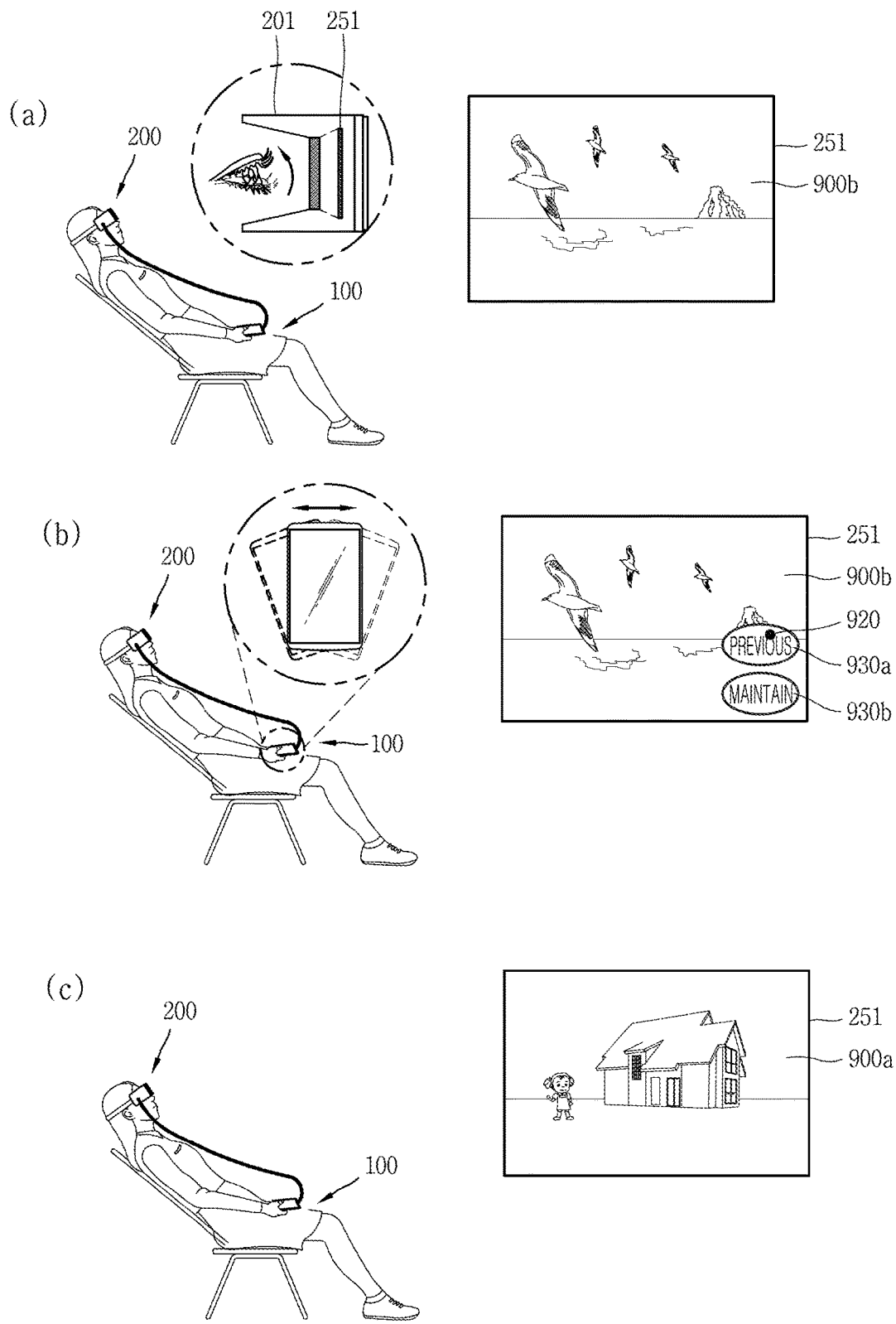

Meanwhile, as illustrated in (a) of FIG. 9C, while the second screen information 900b is output on the display unit 251 of the HMD 200, when a motion that the user wearing the HMD 200 opens the eyes is detected through the sensing unit 240 of the HMD 200, the controller 180, as illustrated in (b) of FIG. 9C, may control the display unit 251 of the HMD 200 to output a graphic object 930a linked to a function of outputting the first screen information 900a.

Afterwards, the controller 180 may detect the user's eyes through the sensing unit 240 of the HMD 200. As illustrated in (b) of FIG. 9C, when the terminal main body 100 makes a specific motion while the user views the graphic object 930a with the eyes, the controller 180, as illustrated in (c) of FIG. 9C, may control the display unit 251 of the HMD 200 to output the first screen information 900a.

However, the present invention may not be limited to this. The controller 180 may control the display unit 251 of the HMD 200 to directly output the first screen information 900a, instead of the graphic object 930a, in response to a detection of a motion that the user opens the eyes while the second screen information 900b is output on the display unit 251 of the HMD 200.

As illustrated in FIG. 9C, the output of the graphic object 930a linked to the function of outputting the first screen information 900a (or the output of the first screen information 900a) may be irrelevant to the motion of the HMD 200.

However, the present invention may not be limited to this. In response to the HMD 200 making a preset motion (e.g., moving to a front of the HMD 200 by a predetermined distance or more, or a motion of rotating by a predetermined angle or more) while the user wearing the HMD 200 opens the eyes (or after the user opens the eyes), the controller 180 may control the display unit 251 of the HMD 200 to output a graphic object linked to the function of outputting the first screen information, or directly output the first screen information.

With the configuration, the present invention may allow a specific mode (e.g., a resting mode or a power-saving mode) of an HMD to be released more conveniently by using a mobile terminal, namely, can provide a UI/UX optimized for returning to an original mode (operation) of the HMD.

Meanwhile, the mobile terminal disclosed herein, as aforementioned, may include the sensing unit 140 that senses a motion of the terminal main body.

Figure 10A:
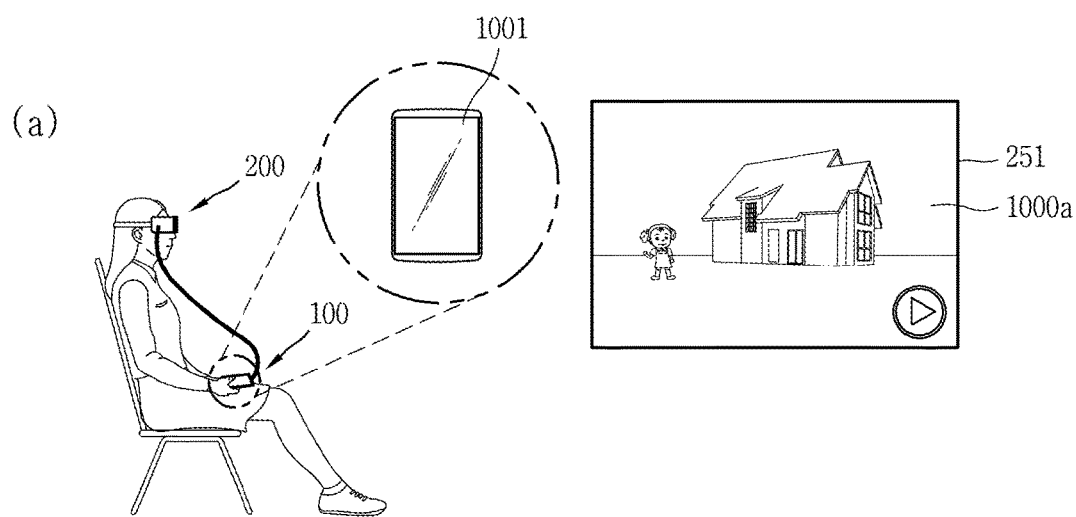
Figure 10A:
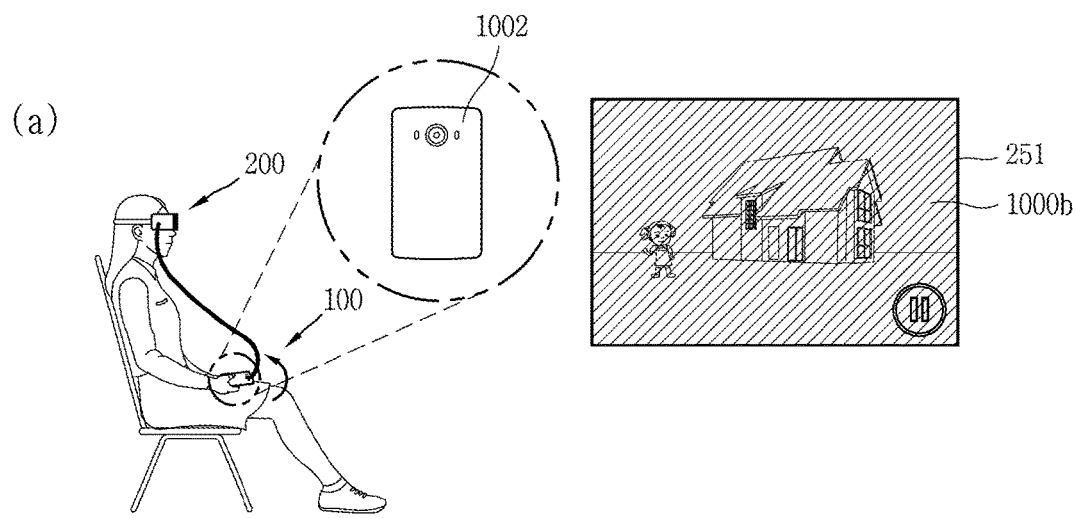

When the terminal main body 100 makes a specific motion (e.g., as illustrated in FIG. 10A, when the terminal main body 100 makes a turning motion (or rotating motion by a predetermined angle or more)), the controller 180, as illustrated in (b) of FIG. 10A, may reduce output brightness of the display unit 251 of the HMD 200. For example, the output brightness of the display unit 251 of the HMD 200 may change from a first output brightness 1000a to a second output brightness 1000b lower than the first output brightness 1000a, in response to the motion of the terminal main body 100.

When screen information currently output on the display unit 251 of the HMD 200 is a video, the controller 180 may stop the output (reproduction) of the video, in response to the terminal main body 100 making the specific motion.

As another example, while first screen information is output on the display unit 251 of the HMD 200, when the terminal main body 100 makes the specific motion, the controller 180 may control the display unit 251 of the HMD 200 to output second screen information, different from the first screen information.

Meanwhile, the controller 180 may set the mobile terminal 100, which is connected to the HMD 200 in the wired manner to serve as the controller, to a power-saving mode (or a resting mode) when the terminal main body 100 makes a specific motion. The mobile terminal 100 set to the power-saving mode may be configured to sense only the motion of the terminal main body, and the controller 180 may release the power-saving mode, in response to a detection of a motion opposite to the specific motion (or a motion linked to a function of releasing the power-saving mode).

Figure 10B:
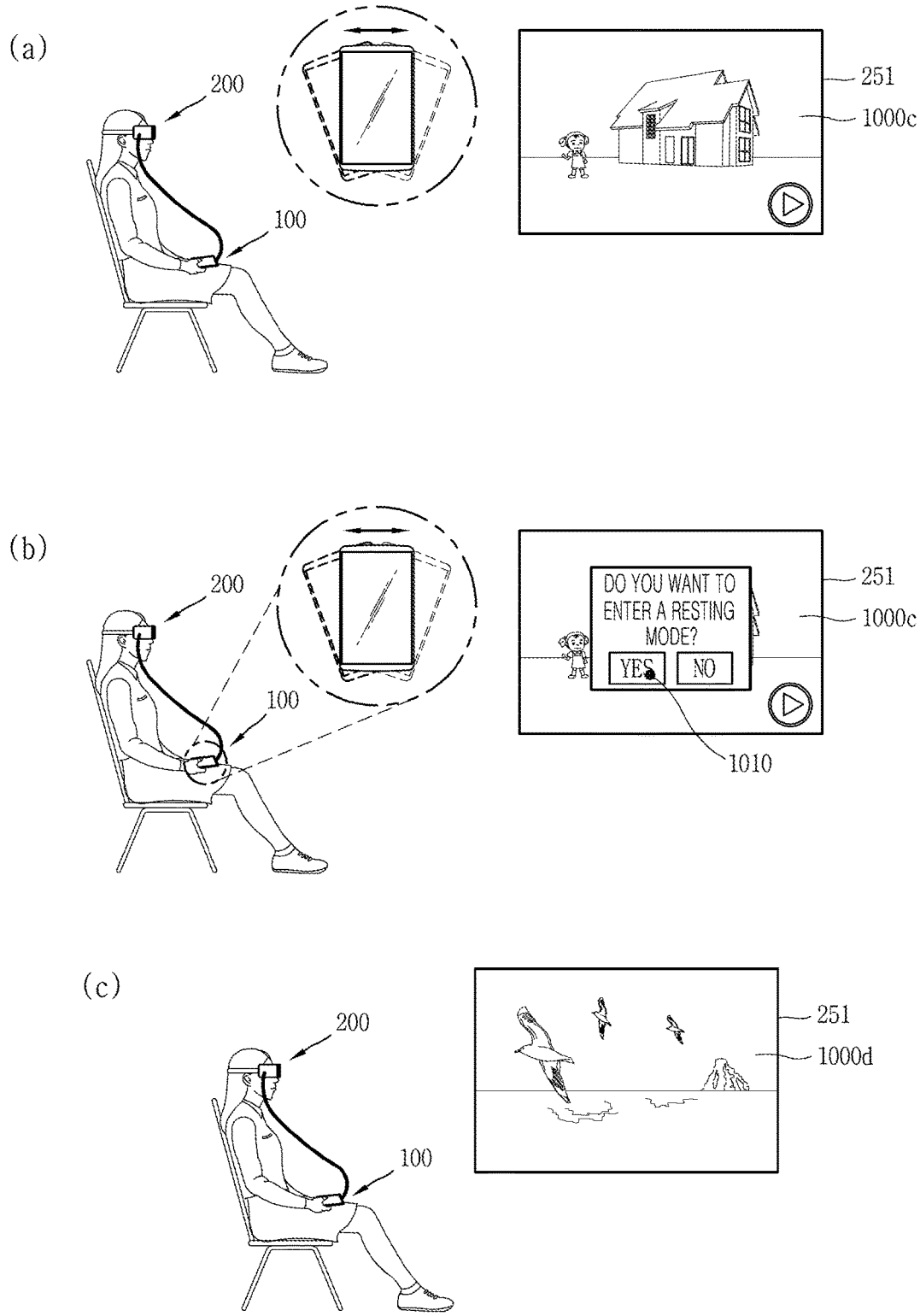

As illustrated in (a) of FIG. 10B, while the first screen information 1000c is output, when the terminal main body 100 makes a preset motion (or a specific motion), the controller 180, as illustrated in (b) of FIG. 10C, may control the display unit 251 of the HMD 200 to output a select window for the user to select an entrance into a specific mode.

Afterwards, as illustrated in (b) of FIG. 10B, when the user's eyes and the motion of the terminal main body are detected through the sensing unit 240 of the HMD 200, the controller 180, as illustrated in (c) of FIG. 10B, may enter the specific mode.

A method of releasing the specific mode may be implemented by applying the method illustrated in FIG. 10C in a reversed order.

As described above, the present invention can provide a user interface capable of controlling an HMD using a mobile terminal through an optimized method.

The present invention may also provide a user interface, capable of allowing the user using the HMD to take a break by an optimized method.

An additional area to which the present invention can be applied may be obvious from the detailed description. However, since those skilled in the art can obviously understand that variations and modifications can be made within the scope and range of the present invention, it should be understood that specific embodiments such as the preferred embodiments of the present invention are merely illustrative.

This specification has described that the HMD 200 is controlled by the controller 180 of the mobile terminal 100, but the HMD 200 may alternatively be controlled by the controller 280 thereof. For example, the controller 280 of the HMD 200 may detect an eye motion of a user wearing the HMD 200 by using the sensing unit 240 of the HMD 200, and control the display unit 251 of the HMD 200 by a preset method when the detected eye motion corresponds to a preset motion. FIGS. 6 to 10b can be applied the same or similarly in the aforementioned manner.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

Therefore, an aspect of the detailed description is to provide a mobile terminal, capable of controlling a head mounted display (HMD) by an optimized method, and a method for controlling the same.

Another aspect of the detailed description is to provide a control method capable of controlling screen information outputtable on an HMD, and a method for controlling the same.

To achieve these and other advantages and in accordance with the purpose of this specification, as embodied and broadly described herein, there is provided a mobile terminal that is capable of controlling a head mounted display (HMD), the mobile terminal including an interface unit capable of allowing for a wired connection with the head mounted display, and a controller capable of detecting an eye motion (eyes motion) of a user wearing the head mounted display using a sensing unit provided in the head mounted display, and controlling a display unit of the head mounted display by a preset method when the eye motion corresponds to a preset motion.

In an exemplary embodiment, the preset motion may be a motion that the user closes the eyes.

In an exemplary embodiment, the controller may reduce output brightness of the display unit of the head mounted display when the motion that the user wearing the head mounted display closes the eyes is detected.

In an exemplary embodiment, the controller may stop a reproduced video, in response to a detection of the motion that the user wearing the head mounted display closes the eyes, when screen information output on the display unit of the head mounted display is the video that is currently reproduced.

In an exemplary embodiment, screen information output on the display unit of the head mounted display may vary based on a motion of the head mounted display. The controller may not vary but maintain the screen information output on the display unit of the head mounted display when the head mounted display is moved while the user wearing the head mounted display closes the eyes.

In an exemplary embodiment, the controller may output a part of a virtual space on the display unit of the head mounted display. The virtual space may include at least one graphic object linked to a preset function. The controller may reduce output brightness of the display unit of the head mounted display when an output of a part, without including the at least graphic object, of the virtual space is maintained for a predetermined period of time.

In an exemplary embodiment, the controller may restore the reduced output brightness of the display unit of the head mounted display to an original output brightness when a part, including the at least one graphic object, of the virtual space is output on the display unit of the head mounted display, in response to a motion of the head mounted display.

In an exemplary embodiment, the controller may detect a motion of the head mounted display through the sensing unit of the head mounted display. The display unit of the head mounted display may output thereon second screen information, different from first screen information, when the head mounted display makes a preset motion while the first screen information is output.

In an exemplary embodiment, the controller may output the second screen information on the display unit of the head mounted display, in response to a detection of a motion that the user wearing the head mounted display closes the eyes after the head mounted display makes the preset motion.

In an exemplary embodiment, the controller may output a graphic object linked to a function of outputting the second screen information on the display unit of the head mounted display when the head mounted display makes the preset motion.

In an exemplary embodiment, the mobile terminal may further include a sensing unit capable of detecting a motion of a terminal main body. The controller may detect the eyes of the user wearing the head mounted display using the sensing unit of the head mounted display. The controller may output the second screen information on the display unit of the head mounted display when the terminal main body makes a specific motion while the user views the graphic object with the eyes.

In an exemplary embodiment, the controller may output a graphic object linked to a function of outputting the first screen information on the display unit of the head mounted display when a motion that the user wearing the head mounted display opens the eyes is detected through the sensing unit of the head mounted display while the second screen information is output on the display unit of the head mounted display.

In an exemplary embodiment, the mobile terminal may further include a sensing unit capable of detecting a motion of a terminal main body. The controller may reduce output brightness of the display unit of the head mounted display when the terminal main body makes a specific motion.

To achieve these and other advantages and in accordance with the purpose of this specification, as embodied and broadly described herein, there is provided a method for controlling a mobile terminal that is capable of controlling a head mounted display, the method including detecting an eye motion of a user wearing the head mounted display using a sensing unit provided in the head mounted display connected to the mobile terminal in a wired manner, and controlling a display unit of the head mounted display by a preset method when the eye motion corresponds to a preset motion.

In an exemplary embodiment, the preset operation may be a motion that the user closes the eyes.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal for controlling a head mounted display (HMD) having a display and a first sensor, the mobile terminal comprising:
   an interface to provide a wired connection with the head mounted display; and
   a controller configured to detect an eye motion of a user wearing the head mounted display based on information from the first sensor at the head mounted display, and the controller to control the display at the head mounted display when the detected eye motion corresponds to a preset motion,
   wherein the controller is configured to control the display of the head mounted display to output a first part of a virtual space, wherein the virtual space includes at least one graphic object linked to a preset function, and
   wherein the controller is configured to:
      determine whether the at least one graphic object linked to the preset function is included in the first part of the virtual space,
      control the display to reduce output brightness of the display of the head mounted display when the at least one graphic object is determined to not be included in the first part of the virtual space displayed on the display of the head mounted display,
      display a second part, different from the first part, of the virtual space on the display of the head mounted display in response to movement of the head mounted display,
      determine whether the at least one graphic object linked to the preset function is included in the second part of the virtual space, and
      control the display to restore the reduced output brightness of the display to an original output brightness of the display when the at least one graphic object is determined to be included in the second part of the virtual space displayed on the head mounted display.

2. The terminal of claim 1, wherein the preset motion corresponds to a motion of the user closing at least one eye.

3. The terminal of claim 2, wherein the controller is configured to control brightness of the display at the head mounted display when the detected motion is the closing of the at least one eye.

4. The terminal of claim 2, wherein in response to the detected motion of the at least one eye, the controller is configured to stop a video when screen information output on the display corresponds to the video.

5. The terminal of claim 1, wherein the controller detects movement of the head mounted display based on the first sensor at the head mounted display, and
   wherein when the head mounted display is moved in a preset manner while first screen information is output, the display at the head mounted display outputs second screen information, different from the first screen information.

6. The terminal of claim 5, wherein in response to detection of the user closing at least one eye after the head mounted display moves in the preset motion, the controller outputs the second screen information on the display.

7. The terminal of claim 5, wherein the controller controls the display to output a graphic object linked to a function of outputting the second screen information on the display when the head mounted display moves in the preset motion.

8. The terminal of claim 7, further comprising:
   a terminal body; and
   a second sensor to detect movement of a terminal body,
   wherein the controller detects the eyes of the user based on the first sensor of the head mounted display, and
   wherein the controller controls the display to output the second screen information on the display when the terminal body is moved in a specific manner while the graphic object is viewed.

9. The terminal of claim 5, wherein the controller controls the display to output a graphic object linked to a function of outputting the first screen information on the display when a motion of the eyes being opened is detected by the first sensor of the head mounted display while the second screen information is output on the display at the head mounted display.

10. The terminal of claim 1, further comprising:
    a terminal body; and
    a second sensor to detect movement of a terminal body, and
    wherein the controller controls the display to reduce output brightness of the display when the terminal body is moved in a specific manner.

11. The terminal of claim 1, wherein the controller is configured to control the display of the head mounted display to display a first screen information,
    when a movement of the head mounted display is sensed by the controller while a motion of the eyes being opened is detected via the first sensor, the controller controls the display of the head mounted display to display a second screen information rather than the first screen information, and
    when the movement of the head mounted display is sensed by the controller while a motion of the eyes being closed is detected via the first sensor, the controller controls the display of the head mounted display to fix the first screen information displayed on the display of the head mounted display without change.

12. A method of controlling a mobile terminal for controlling a head mounted display (HMD) that is coupled to the mobile terminal by a wire, the head mounted display having a display and a first sensor, the method comprising:
    detecting an eye motion of a user wearing the head mounted display based on information from the first sensor at the head mounted display;
    controlling the display at the head mounted display when the detected motion corresponds to a preset motion;
    controlling the display of the head mounted display to output a first part of a virtual space, wherein the virtual space includes at least one graphic object linked to a preset function;
    determining whether the at least one graphic object linked to the preset function is included in the first part of the virtual space;
    controlling the display to reduce output brightness of the display of the head mounted display when the at least one graphic object is determined to not be included in the first part of the virtual space displayed on the display of the head mounted display;
    displaying a second part, different from the first part, of the virtual space on the display of the head mounted display in response to movement of the head mounted display;
    determining whether the at least one graphic object linked to the preset function is included in the second part of the virtual space; and controlling the display to restore the reduced output brightness of the display to an original output brightness of the display when the at least one graphic object is determined to be included in the second part of the virtual space displayed on the head mounted display.

13. The method of claim 12, wherein the preset motion corresponds to a motion of the user closing at least one eye.

14. The method of claim 13, comprising changing brightness of the display at the head mounted display when the detected motion is the closing of the at least one eye.

15. The method of claim 13, further comprising in response to the detected motion of the at least one eye, stopping a video when screen information output on the display corresponds to the video.

16. The method of claim 13, further comprising:
varying screen information output on the display based on movement of the head mounted display; and
maintaining the screen information output on the display without varying the screen information when the head mounted display is moved while the user closes at least one of the eyes.

17. The method of claim 12, further comprising:
reducing output brightness of the display when an output of a part, without including the at least graphic object, of the virtual space is maintained for a predetermined period of time.

18. The method of claim 12, further comprising:
detecting movement of the head mounted display based on the first sensor at the head mounted display, and
outputting second screen information on the display when the head mounted display is moved in a preset manner while first screen information is output, the second screen information being different from the first screen information.

19. The method of claim 18, wherein the outputting of the second screen information occurs in response to a detection of movement of the user closing at least one eye after the head mounted display moves in the preset motion.

20. The method of claim 18, further comprising outputting a graphic object linked to a function of outputting the second screen information on the display when the head mounted display moves in the preset motion.

21. The method of claim 20, further comprising:
detecting, by a second sensor, movement of a terminal body of the mobile terminal,
detecting the eyes of the user based on the first sensor at the head mounted display, and
outputting the second screen information on the display at the head mounted display when the terminal body is moved in a specific movement while the graphic object is viewed.

22. The method of claim 18, comprising outputting a graphic object linked to a function of outputting the first screen information on the display at the head mounted display when a motion of the eyes being opened is detected by the first sensor at the head mounted display while the second screen information is output on the display at the head mounted display.

23. The method of claim 12, further comprising:
detecting a movement of a terminal body of the mobile terminal, and
reducing output brightness of the display at the head mounted display when the terminal body is moved in a specific manner.

24. A mobile terminal controlling a head mounted display having a display and a sensor, the mobile terminal comprising:
a display to display an image;
a wireless communicator configured to perform wireless communication with the head mounted display; and
a controller to receive information from the sensor at the head mounted display, to determine eye movement based on the received information, and to provide display information to the head mounted display based on the determined eye movement, wherein the display information is to control brightness of the display, change screen information on the display or control playing of a video on the display,
wherein the controller is configured to control the display of the head mounted display to output a first part of a virtual space, wherein the virtual space includes at least one graphic object linked to a preset function, and
wherein the controller is configured to:
determine whether the at least one graphic object linked to the preset function is included in the first part of the virtual space,
control the display to reduce output brightness of the display of the head mounted display when the at least one graphic object is determined to not be included in the first part of the virtual space displayed on the display of the head mounted display,
display a second part, different from the first part, of the virtual space on the display of the head mounted display in response to movement of the head mounted display,
determine whether the at least one graphic object linked to the preset function is included in the second part of the virtual space, and
control the display to restore the reduced output brightness of the display to an original output brightness of the display when the at least one graphic object is determined to be included in the second part of the virtual space displayed on the head mounted display.

* * * * *